United States Patent
Plotkin et al.

(10) Patent No.: US 8,397,710 B2
(45) Date of Patent: Mar. 19, 2013

(54) SOLAR RECEIVER PANELS

(75) Inventors: Andrew Plotkin, Worcester, MA (US); Craig Gillum, West Boylston, MA (US)

(73) Assignee: Babcock Power Services Inc., Worcester, MA (US)

( * ) Notice: Subject to any disclaimer, the term of this patent is extended or adjusted under 35 U.S.C. 154(b) by 633 days.

(21) Appl. No.: 12/547,650

(22) Filed: Aug. 26, 2009

(65) Prior Publication Data

US 2010/0199974 A1   Aug. 12, 2010

Related U.S. Application Data

(60) Provisional application No. 61/151,984, filed on Feb. 12, 2009, provisional application No. 61/152,011, filed on Feb. 12, 2009, provisional application No. 61/152,035, filed on Feb. 12, 2009, provisional application No. 61/152,049, filed on Feb. 12, 2009, (Continued)

(51) Int. Cl.
*F24J 2/34* (2006.01)
*F24J 2/24* (2006.01)
*F03G 6/00* (2006.01)

(52) U.S. Cl. ...... 126/617; 126/651; 126/655; 60/641.11
(58) Field of Classification Search ............. 126/651, 126/655, 617; 60/641.11
See application file for complete search history.

(56) References Cited

U.S. PATENT DOCUMENTS

| | | |
|---|---|---|
| 2,383,234 A | 8/1945 | Barnes |
| 3,197,343 A | 7/1965 | Palmatier |
| 3,208,877 A | 9/1965 | Merry |
| 3,325,312 A | 6/1967 | Sonntag, Jr. |
| 3,450,192 A | 6/1969 | Hay |
| 3,459,597 A | 8/1969 | Baron |
| 3,464,402 A | 9/1969 | Collura |
| 3,822,692 A | 7/1974 | Demarest |
| 3,823,703 A | 7/1974 | Lanciault |
| 3,893,506 A | 7/1975 | Laing |
| 3,924,604 A | 12/1975 | Anderson |
| 3,927,659 A | 12/1975 | Blake et al. |
| 3,951,108 A | 4/1976 | Rees |
| 3,968,652 A | 7/1976 | Chevalier |
| 3,991,742 A | 11/1976 | Gerber |

(Continued)

FOREIGN PATENT DOCUMENTS

| | | |
|---|---|---|
| FR | 2501839 A1 | 9/1982 |
| JP | 53131309 A | 11/1978 |

(Continued)

OTHER PUBLICATIONS

U.S. Appl. No. 60/943,096, Kroizer.

(Continued)

*Primary Examiner* — Kenneth Rinehart
*Assistant Examiner* — William Corboy
(74) *Attorney, Agent, or Firm* — Edwards Wildman Palmer LLP; Joshua L. Jones

(57) ABSTRACT

A boiler for a solar receiver includes a plurality of boiler panels arranged side by side with each other so that the panels form a boiler wall section. Piping fluidly connects the plurality of boiler panels together to route a working fluid through the boiler wall section from an inlet of the boiler wall section to an outlet of the boiler wall section. The piping and boiler panels are configured and adapted to route the working fluid through each of the boiler panels in a common direction.

2 Claims, 6 Drawing Sheets

Related U.S. Application Data provisional application No. 61/152,077, filed on Feb. 12, 2009, provisional application No. 61/152,114, filed on Feb. 12, 2009, provisional application No. 61/152,286, filed on Feb. 13, 2009.

(56) References Cited

U.S. PATENT DOCUMENTS

| | | |
|---|---|---|
| 3,995,804 A | 12/1976 | Folds et al. |
| 4,003,366 A | 1/1977 | Lightfoot |
| 4,037,639 A | 7/1977 | Jones |
| 4,088,266 A | 5/1978 | Keyes |
| 4,094,147 A | 6/1978 | Alleau et al. |
| 4,112,921 A | 9/1978 | MacCracken |
| 4,120,288 A | 10/1978 | Barrett |
| 4,127,102 A | 11/1978 | Berman |
| 4,127,103 A | 11/1978 | Klank et al. |
| 4,128,096 A | 12/1978 | Katz |
| 4,136,674 A | 1/1979 | Korr |
| 4,191,246 A | 3/1980 | Cassell |
| 4,204,523 A | 5/1980 | Rothe |
| 4,205,658 A | 6/1980 | Clark |
| 4,210,122 A | 7/1980 | Artweger |
| 4,215,676 A | 8/1980 | Gilliam |
| 4,237,861 A | 12/1980 | Fayard et al. |
| 4,245,618 A | 1/1981 | Wiener |
| 4,253,801 A | 3/1981 | O'Hare |
| 4,257,477 A | 3/1981 | Maloney |
| 4,261,330 A | 4/1981 | Reinisch |
| 4,265,223 A | 5/1981 | Miserlis et al. |
| 4,269,172 A | 5/1981 | Parker et al. |
| 4,273,100 A | 6/1981 | Cogliano |
| 4,280,483 A | 7/1981 | Schaffer |
| 4,289,114 A | 9/1981 | Zadiraka |
| 4,296,730 A | 10/1981 | Zadiraka |
| 4,296,733 A | 10/1981 | Saunders |
| 4,312,687 A | 1/1982 | Sigworth, Jr. |
| 4,313,304 A | 2/1982 | Hunt |
| 4,320,663 A | 3/1982 | Francia |
| 4,324,229 A | 4/1982 | Risser |
| 4,338,991 A | 7/1982 | Sigworth, Jr. |
| 4,350,374 A | 9/1982 | Brollo |
| 4,353,356 A | 10/1982 | Vandenbossche |
| 4,359,043 A | 11/1982 | Dominique et al. |
| 4,367,726 A | 1/1983 | Maes, Jr. |
| 4,371,035 A | 2/1983 | Soligno |
| 4,373,512 A | 2/1983 | Hirt |
| 4,380,996 A | 4/1983 | Mengeringhausen |
| 4,384,550 A | 5/1983 | Miller |
| 4,394,859 A | 7/1983 | Drost |
| 4,404,960 A | 9/1983 | Laing |
| 4,416,265 A | 11/1983 | Wallace |
| 4,428,361 A | 1/1984 | Straza |
| 4,432,341 A | 2/1984 | Howe et al. |
| 4,454,863 A | 6/1984 | Brown et al. |
| 4,485,803 A | 12/1984 | Wiener |
| 4,503,903 A | 3/1985 | Kramer |
| 4,512,336 A | 4/1985 | Wiener |
| 4,535,755 A | 8/1985 | Roberts |
| 4,569,331 A | 2/1986 | Tani et al. |
| 4,615,381 A | 10/1986 | Maloney |
| 4,653,470 A | 3/1987 | Carli et al. |
| 4,660,630 A | 4/1987 | Cunningham et al. |
| 4,665,894 A | 5/1987 | Juhasz |
| 4,712,338 A | 12/1987 | Trickel |
| 4,768,345 A | 9/1988 | Kardas |
| 4,832,119 A | 5/1989 | Bloor et al. |
| 4,867,133 A | 9/1989 | Sadler |
| 4,946,512 A | 8/1990 | Fukuroi et al. |
| 4,972,806 A | 11/1990 | Marsault |
| 5,163,821 A | 11/1992 | Kelly et al. |
| 5,174,128 A | 12/1992 | Bourne et al. |
| 5,201,282 A | 4/1993 | Albrecht |
| 5,217,000 A | 6/1993 | Pierce-Bjorklund |
| 5,342,016 A | 8/1994 | Marsault et al. |
| 5,368,092 A | 11/1994 | Rearden et al. |
| 5,404,937 A | 4/1995 | Assaf et al. |
| 5,417,052 A | 5/1995 | Bharathan et al. |
| 5,444,972 A | 8/1995 | Moore |
| 5,482,233 A | 1/1996 | Marko et al. |
| 5,694,774 A | 12/1997 | Drucker |
| 5,727,379 A | 3/1998 | Cohn |
| 5,823,176 A | 10/1998 | Harris |
| 5,850,831 A | 12/1998 | Marko |
| 5,857,322 A | 1/1999 | Cohn |
| 5,862,800 A | 1/1999 | Marko |
| 5,881,456 A | 3/1999 | Bergins et al. |
| 5,943,985 A | 8/1999 | Hartman |
| 6,126,120 A | 10/2000 | Quaranta et al. |
| 6,155,339 A | 12/2000 | Grapengater |
| 6,173,927 B1 | 1/2001 | Delsol |
| 6,240,156 B1 | 5/2001 | Matsumoto et al. |
| 6,301,928 B1 | 10/2001 | Tanatsugu et al. |
| 6,434,942 B1 | 8/2002 | Charlton |
| 6,487,859 B2 | 12/2002 | Mehos et al. |
| 6,497,102 B2 | 12/2002 | Liebig |
| 6,532,953 B1 | 3/2003 | Blackmon et al. |
| 6,668,555 B1 | 12/2003 | Moriarty |
| 6,708,687 B2 | 3/2004 | Blackmon, Jr. et al. |
| 6,736,134 B2 | 5/2004 | Marko |
| 6,913,015 B2 | 7/2005 | Pajk |
| 6,926,440 B2 | 8/2005 | Litwin |
| 6,931,851 B2 | 8/2005 | Litwin |
| 7,011,086 B2 | 3/2006 | Litwin |
| 7,600,350 B2 | 10/2009 | Braunstein |
| 7,640,746 B2 | 1/2010 | Skowronski et al. |
| 7,806,377 B2 | 10/2010 | Strizki |
| 2001/0010222 A1 | 8/2001 | Prueitt |
| 2002/0029869 A1 | 3/2002 | Kodumudi et al. |
| 2003/0041856 A1 | 3/2003 | Blackmon et al. |
| 2004/0035111 A1 | 2/2004 | Ven et al. |
| 2004/0112374 A1 | 6/2004 | Litwin |
| 2004/0139961 A1 | 7/2004 | Blackmon et al. |
| 2004/0244376 A1 | 12/2004 | Litwin et al. |
| 2004/0251002 A1 | 12/2004 | Reichle et al. |
| 2004/0255571 A1 | 12/2004 | Fetescu et al. |
| 2005/0016524 A1 | 1/2005 | Broatch |
| 2006/0225863 A1 | 10/2006 | Levin |
| 2006/0260314 A1 | 11/2006 | Kincaid et al. |
| 2007/0089775 A1 | 4/2007 | Lasich |
| 2007/0119718 A1 | 5/2007 | Gibson et al. |
| 2007/0227531 A1 | 10/2007 | Garcia Cors et al. |
| 2007/0295382 A1 | 12/2007 | Oak |
| 2008/0000231 A1 | 1/2008 | Litwin et al. |
| 2008/0022685 A1 | 1/2008 | Zhu |
| 2008/0053523 A1 | 3/2008 | Brown et al. |
| 2008/0078378 A1 | 4/2008 | Zhu |
| 2008/0092551 A1 | 4/2008 | Skowronski |
| 2008/0256953 A1 | 10/2008 | Arkas et al. |
| 2008/0302357 A1 | 12/2008 | DeNault |
| 2009/0014057 A1 | 1/2009 | Croft et al. |
| 2009/0101134 A1 | 4/2009 | Merrett |
| 2009/0107146 A1 | 4/2009 | Lin |
| 2009/0114269 A1 | 5/2009 | Fletcher et al. |
| 2009/0114270 A1 | 5/2009 | Stancel |
| 2009/0199557 A1 | 8/2009 | Bennett |
| 2009/0250051 A1 | 10/2009 | Lata Perez |
| 2009/0260359 A1* | 10/2009 | Palkes .......................... 60/641.8 |
| 2009/0261591 A1* | 10/2009 | Palkes et al. .................... 290/52 |
| 2009/0276993 A1 | 11/2009 | Fedock et al. |
| 2010/0229853 A1 | 9/2010 | Vandal et al. |
| 2010/0236183 A1 | 9/2010 | Cusson et al. |

FOREIGN PATENT DOCUMENTS

| | | |
|---|---|---|
| JP | 08326223 A | 12/1996 |
| WO | WO-2008154599 A1 | 12/2008 |

OTHER PUBLICATIONS

International Search Report and Written Opinion, dated Aug. 30, 2010 for PCT/US2010/023124.

International Search Report and Written Opinion, dated Aug. 31, 2010 for PCT/US2010/023165.

International Search Report and Written Opinion, dated Oct. 13, 2010 for PCT/US2010/023622.

International Search Report and Written Opinion, dated Oct. 13, 2010 for PCT/US2010/023826.
International Search Report and Written Opinion, dated Dec. 13, 2010 for PCT/US2010/023367.

International Search Report and Written Opinion, dated Dec. 13, 2010 for PCT/US2010/023500.

* cited by examiner

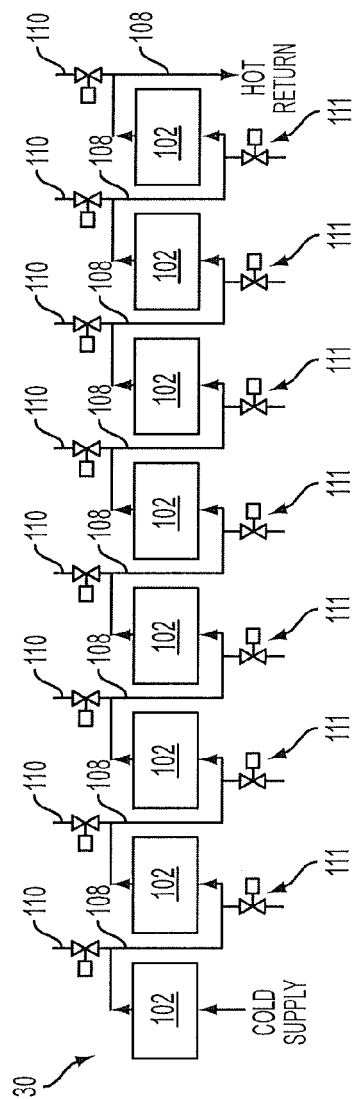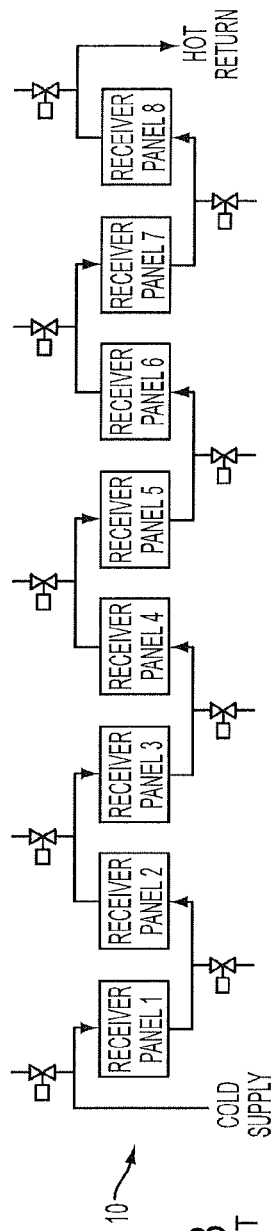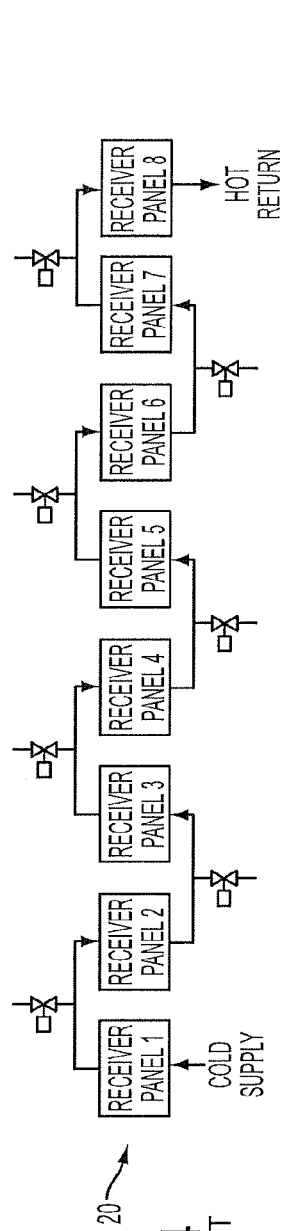
FIG. 2
FIG. 3
PRIOR ART
FIG. 4
PRIOR ART

SOLAR RECEIVER PANELS

CROSS-REFERENCE TO RELATED APPLICATIONS

This application claims priority to U.S. Provisional application No. 61/151,984, filed Feb. 12, 2009, to U.S. Provisional application No. 61/152,011, filed Feb. 12, 2009, to U.S. Provisional application No. 61/152,035, filed Feb. 12, 2009, to U.S. Provisional application No. 61/152,049, filed Feb. 12, 2009, to U.S. Provisional application No. 61/152,077, filed Feb. 12, 2009, to U.S. Provisional application No. 61/152,114, filed Feb. 12, 2009, and to U.S. Provisional application No. 61/152,286, filed Feb. 13, 2009, each of which is incorporated by reference herein in its entirety.

BACKGROUND OF THE INVENTION

1. Field of the Invention

The present invention relates to solar power production, and more particularly, to solar receiver panels for use in solar boilers.

2. Description of Related Art

Solar power generation has been considered a viable source to help provide for energy needs in a time of increasing consciousness of the environmental aspects of power production. Solar energy production relies mainly on the ability to collect and convert energy freely available from the sun and can be produced with very little impact on the environment. Solar power can be produced without creating radioactive waste as in nuclear power production, and without producing pollutant emissions including greenhouse gases as in fossil fuel power production. Solar power production is independent of fluctuating fuel costs and does not consume non-renewable resources.

Solar power generators generally employ fields of controlled mirrors, called heliostats, to gather and concentrate sunlight on a receiver to provide a heat source for power production. A solar receiver typically takes the form of a panel of tubes conveying a working fluid therethrough. Previous solar generators have used working fluids such as molten salt because it has the ability to store energy, allowing power generation when there is little or no solar radiation. The heated working fluids are typically conveyed to a heat exchanger where they release heat into a second working fluid such as air, water, or steam. Power is generated by driving heated air or steam through a turbine that drives an electrical generator.

More recently, it has been determined that solar production can be increased and simplified by using water/steam as the only working fluid in a receiver that is a boiler. This can eliminate the need for an inefficient heat exchanger between two different working fluids. This development has lead to new challenges in handling the intense solar heat without damage to the system. In a solar boiler, heat transfer rates can reach levels around 2-3 times the heat transfer rate of a typical fossil fuel fired boiler. This high heat transfer rate intensifies problems related to maintaining even heating and flow distribution throughout known designs of boiler panels. If flow through a portion of a receiver panel is insufficient when using water/steam as a working fluid, overheating can result for that panel portion. Such overheating can result in damage or failure of the panel and its constituent tubes if the temperatures are allowed to become severe.

Additionally, solar boilers differ from fossil fuel fired boilers in terms of operating hours. Fossil fuel fired boilers typically operate continuously, stopping only for occasional routine maintenance, whereas solar boilers must start up and shut down once per day due to the rising and setting of the sun. There is a daily thermal expansion cycle that can result in increased fatigue failure in typical boiler components.

While the known systems of solar power production have generally been considered satisfactory for their intended purposes, there has remained a need in the art for solar receivers that can improve heat and fluid flow distribution as well as provide for improved drainability and resistance to fatigue. There also has remained a need in the art for such solar receivers that are easy to make and use. The present invention provides a solution to these problems.

SUMMARY OF THE INVENTION

The subject invention is directed to a new and useful boiler for a solar receiver. The boiler includes a plurality of boiler panels arranged side by side with each other so that the panels form a boiler wall section. Piping fluidly connects the plurality of boiler panels together to route a working fluid through the boiler wall section from an inlet of the boiler wall section to an outlet of the boiler wall section. The piping and boiler panels are configured and adapted to route the working fluid through each of the boiler panels in a common direction.

In certain embodiments, the common direction in which working fluid is routed through each of the boiler panels is upward. The boiler can further include at least one drain valve and at least one vent valve each in fluid communication with the piping wherein the piping, the boiler panels, at least one drain valve, and at least one vent valve are configured and adapted to drain the boiler panels of working fluid. At least one drain valve and one at least one vent valve can be provided for each boiler panel.

In accordance with certain embodiments, the piping is configured and adapted to route working fluid through a series of pairs of individual boiler panels. The individual boiler panels of each pair of boiler panels are in parallel with each other within the respective pair of boiler panels. The piping can include a plurality of down flow pipes, each down flow pipe fluidly connecting upper outlet headers of a first pair of boiler panels to lower inlet headers of a second pair of boiler panels. The boiler wall section can include four pairs of individual boiler panels.

The invention also provides a boiler for a solar receiver including a plurality of boiler walls surrounding a boiler interior space. Each boiler wall includes a plurality of boiler panels arranged side by side with each other to form at least one boiler wall section. Piping fluidly connects the plurality of boiler panels together to route a working fluid through each boiler wall section from an inlet of the boiler wall section to an outlet of the boiler wall section. The piping and boiler panels are configured and adapted to route the working fluid through each of the boiler panels in a common direction.

The invention also provides a boiler for a solar receiver including a boiler drum in fluid communication with a steam generator, a superheater, and a reheater. Each of the steam generator, superheater, and reheater includes at least one boiler wall. Each boiler wall includes a plurality of boiler panels arranged side by side with each other. Piping fluidly connects the plurality of boiler panels together to route a working fluid through the at least one boiler wall from at least one inlet of at least one boiler wall to at least one outlet of at least one boiler wall. The piping and boiler panels are configured and adapted to route the working fluid through each of the boiler panels in an upward direction.

In certain embodiments, each boiler wall includes one section having four pairs of individual boiler panels, wherein the piping of each of the superheater and the reheater is configured and adapted to route working fluid through a series of pairs of individual boiler panels, and wherein the individual boiler panels of each pair of boiler panels are in parallel with each other within the respective pair of boiler panels. In accordance with certain embodiments, each of the steam generator, superheater, and reheater includes four boiler walls surrounding a boiler interior, wherein the steam generator, superheater, and reheater are stacked in alignment with one another.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein:

FIG. 2 is a schematic view of an exemplary configurations of boiler panels constructed in accordance with the present invention, showing all of the panels connected in series with one another, showing the flow path from the inlet of the boiler wall to the outlet of the boiler wall such that there is an upward flow in each panel, and showing the drain and vent valve configuration;

FIG. 3 is a schematic view of a prior art boiler system showing the drain and vent valves arrangement in a conventional wall of boiler panels;

FIG. 4 is a schematic view of another prior art boiler system showing the drain and vent valves arrangement in a conventional wall of boiler panels;

DETAILED DESCRIPTION OF THE PREFERRED EMBODIMENTS

Figure 1:
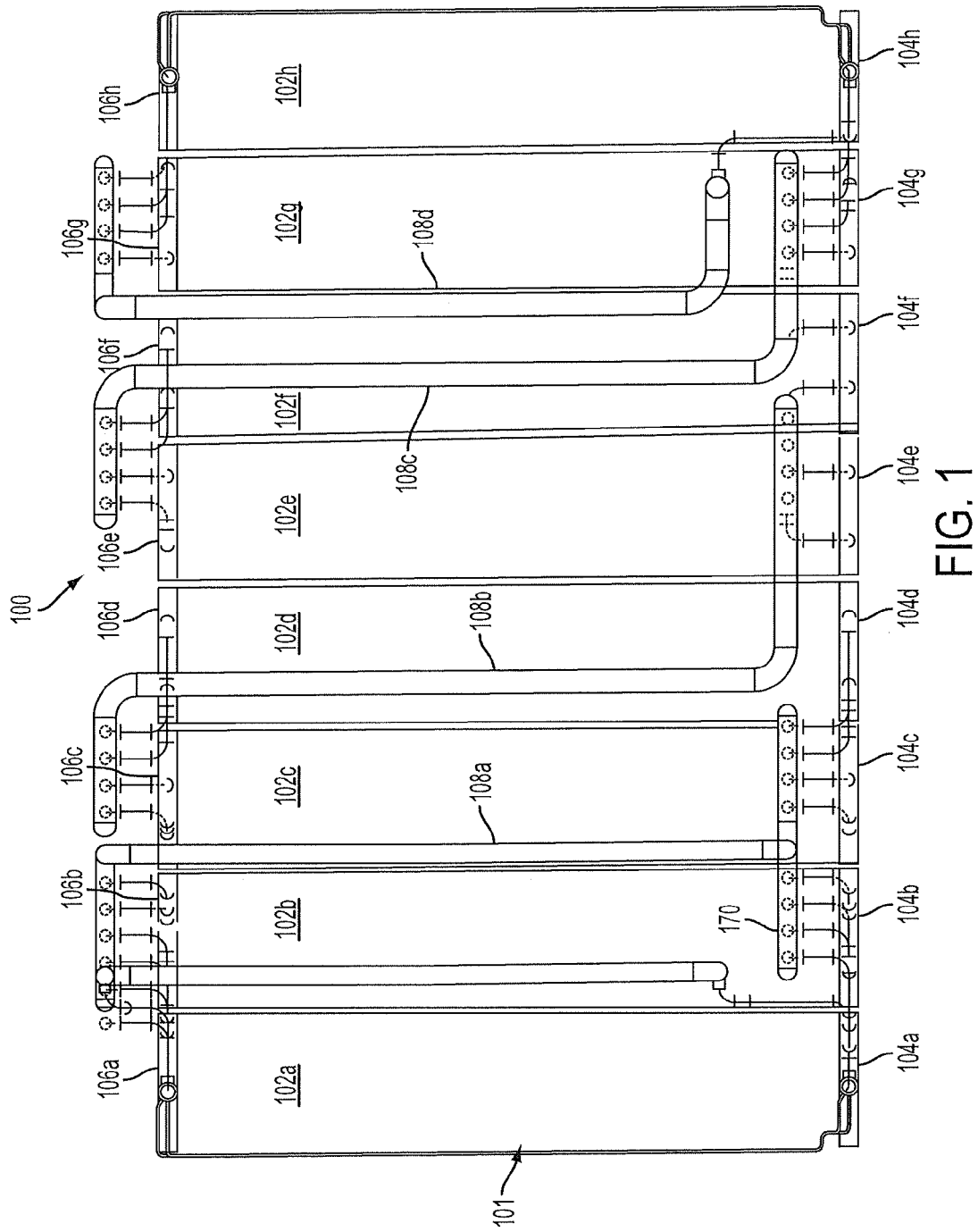
FIG. 1 is an elevation view of an exemplary embodiment of a section of boiler panels in a boiler wall constructed in accordance with the present invention, showing the interior side of the panels including the piping to convey working fluid through the panels.

Reference will now be made to the drawings wherein like reference numerals identify similar structural features or aspects of the subject invention. For purposes of explanation and illustration, and not limitation, a partial view of an exemplary embodiment of a boiler in accordance with the invention is shown in FIG. 1 and is designated generally by reference character 100. Other embodiments of a boiler in accordance with the invention, or aspects thereof, are provided in FIGS. 2, and 5-8 as will be described. The systems of the invention can be used to improve heat distribution and flow distribution in boilers, for example in solar power generation.

In a boiler, parallel flow instability is defined as a stagnation and reversal of fluid flow in down flow tubing. Flow instability occurs in down flowing circuits when the fluid static head between two common headers is greater than the frictional pressure drop in the tubes between those same headers. This creates a flow field where the pressure increases along the flow path creating an adverse pressure gradient. These conditions can exist during the low load operation associated with startup and shutdown. When an adverse pressure gradient exists, and an unbalance condition such as uneven solar heating is applied to the tubes, flow stagnation and flow reversal can occur.

In a solar boiler, the length of the panels can be relatively short when compared to conventional panel lengths. It is possible to use longer panels as in conventional fossil fuel boilers, which would spread the heat input over a larger area. However efficiency of a solar boiler is directly related to the amount of radiation loss, which is a function of panel area. Therefore, it is desirable to use smaller or shorter panels than in typical fossil fuel boilers. Adding to the problem is the desire in solar receiver applications to have straight panels without bends. Straight panels contribute to the low frictional pressure drop that leads to flow instabilities. The solar radiation field directed by heliostats onto solar boilers is generally not perfectly uniform. Non-uniform solar radiation fields result in asymmetric heating of boiler panels in both the vertical and horizontal directions. The daily startup and shutdown cycles, geometrical configuration, and asymmetric heating produce conditions where it is often the case that the static head is greater than the frictional pressure loss, causing parallel flow instability. When this occurs, some tubes in a given boiler panel may experience a no flow condition, which can lead to tube overheating and failure.

Referring now to FIG. 1, a boiler 100 for use as a solar receiver in accordance with the present invention is shown which can address the problem of parallel flow instability. Boiler 100 includes eight boiler panels 102a-102h that are arranged side by side with each other so as to form a section 101 of a boiler wall. Each of panels 102a-102h is made up of a plurality of individual tubes running from an inlet at lower header 104a-104h to an outlet at upper header 106a-106h, respectively. A working fluid, such as water, steam, or a water steam mixture, flows through the inside of the tubes while solar radiation heats the tubes from the outside. The working fluid thus serves to convey heat from the solar radiation to be used in power generation, for example by passing through a steam turbine.

Figure 5:
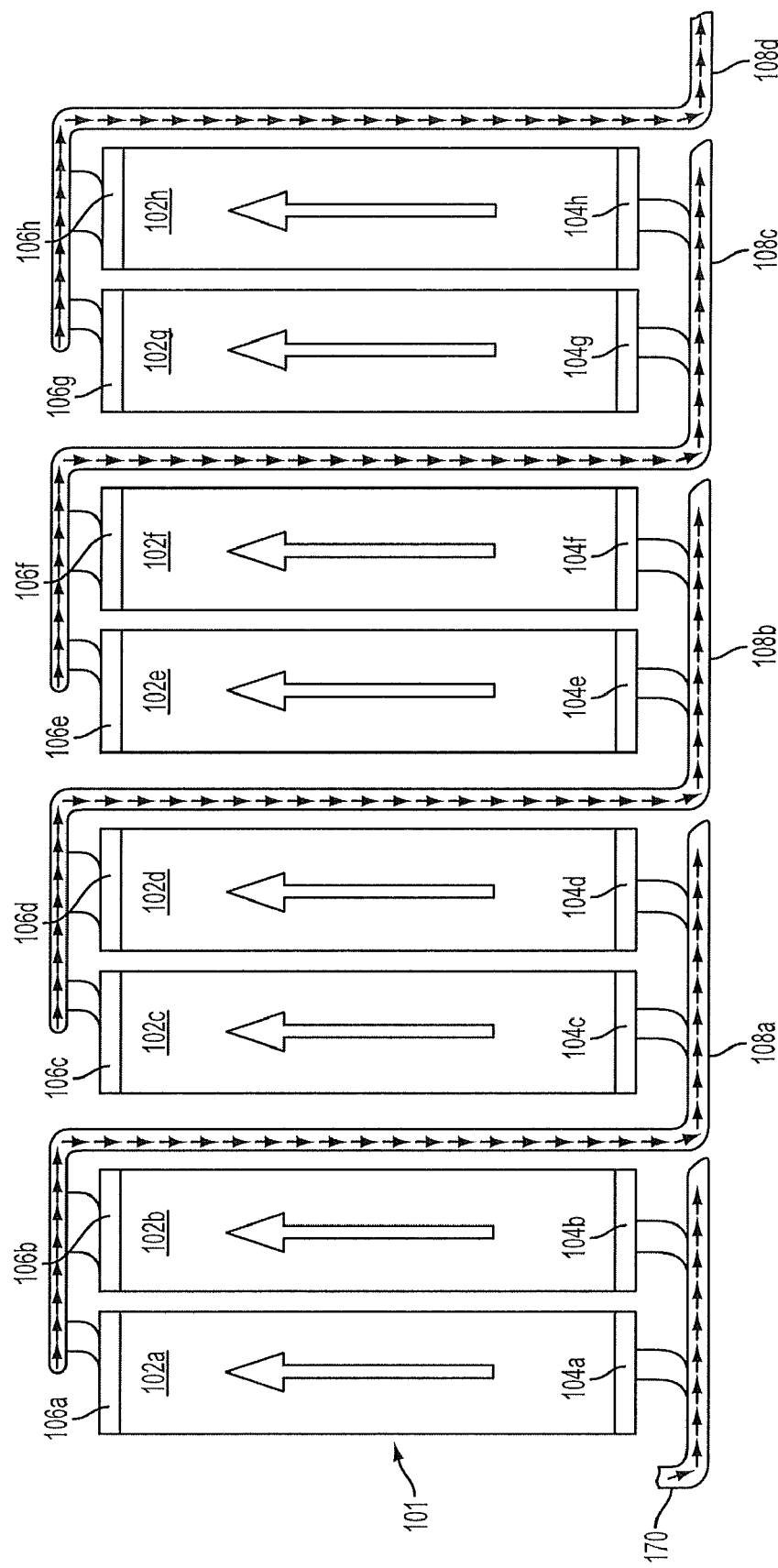
FIG. 5 is a schematic view of the boiler panels of FIG. 1, showing the upward flow through each pair of parallel panels, and showing the downward flow through the piping.

Referring now to FIG. 5, the boiler wall section 101 of FIG. 1 is shown schematically to show the upflow and downflow portions thereof. Working fluid is introduced to section 101 at inlet pipe 170. Inlet pipe 170 feeds working fluid from a cold source into the lower headers 104a and 104b of the first two panels 102a and 102b, respectively. The working fluid flows upward through the tubes of each panel 102a and 102b to the respective upper headers 106a and 106b, which feed into pipe 108a. Pipe 108a conveys the working fluid down to lower headers 104c and 104d of the next pair of panels 102c and 102d, respectively. Working fluid passes upward through the tubes of panels 102c and 102d to upper headers 106c and 106d, which feed into pipe 108b. Pipe 108b conveys the working fluid down to lower headers 104e and 104f of the third pair of panels 102e and 102f, respectively. The working fluid passes upward through the tubes of panels 102*e* and 102*f* to upper headers 106*e* and 106*f*, which feed into pipe 108*c*. Pipe 108*c* conveys the working fluid down to lower headers 104*g* and 104*h* of the final pair of panels 102*g* and 102*h*, respectively. The working fluid passes upward through the tubes of panels 102*g* and 102*h* to upper headers 106*g* and 106*h*, respectively, which feed into pipe 108*d*. Pipe 108*d* returns the heated working fluid to a hot return.

The flow arrows in FIG. 5 schematically indicate the route of working fluid through boiler wall section 101 shown in FIG. 1. As can be seen in FIG. 5, the piping including pipes 170 and 108*a*-108*d* routes the working fluid through panels 102*a*-102*h* so that the flow direction through each of panels 102*a*-102*h* is upward. It can also be seen in FIG. 5 that panels 102*a*-102*h* are arranged into a series of four pairs of panels. Each pair has two panels in parallel with each other, e.g., panels 102*a* and 102*b* are in parallel with each other, making the first pair in a series of four pairs. Each pair of panels constitutes a single pass. Boiler 100 is a four pass boiler, meaning the working fluid passes through each heating section 101 four times as it flows from inlet pipe 170 to an outlet of pipe 108*d*.

With reference now to the schematic view of another exemplary embodiment of a boiler 30 shown in FIG. 2, eight pipes 108, such as pipes 108*a*-108*d* described above, fluidly connect eight panels, such as panels 102*a*-102*h* described above, together in series so as to route the working fluid through the boiler wall from an inlet (labeled "cold supply") of the boiler wall to an outlet (labeled "hot return") of the boiler wall. All of the panels 102 of solar boiler 30 are configured for upward flow, the same as in boiler 100 described above in conjunction with FIG. 5. Boiler 30 differs from boiler 100 described above in that boiler 30 has eight panels 102 in simple series with each other, without pairs of panels being in parallel. Those skilled in the art will readily appreciate that any suitable number of panels can be used, and that any suitable number of subsets of panels can be in parallel without departing from the spirit and scope of the invention.

Using all upward flowing panels as described above with respect to boilers 30 and 100 eliminates the adverse pressure gradient that is a necessary condition for parallel flow instability. The piping (e.g. pipes 108) brings the steam flow from the top of a panel or group of parallel panels (e.g. panels 102) to the bottom of the next panel or group of parallel panels, the pattern being repeated for as many panels or groups of parallel panels as are present.

As indicated in FIG. 2, the piping includes drain valves 111 and vents 110 in pipes 108 for draining the boiler panels 102 of working fluid. Vents 110 and drain valves 111 can be used to drain panels 102 for maintenance or if the weather requires draining at night when the boiler is not heated in order to prevent damage from freezing water in the tubes of panels 102. The example shown in FIG. 2 shows one vent 110 provided for each boiler panel 102, and one drain valve 111 between each pair of panels 102. Those skilled in the art will readily recognize that any suitable number of drains/vents can be used without departing from the spirit and scope of the invention.

FIGS. 3 and 4 show prior art solar receiver configurations in which some panels have upward flow and others have downward flow. In FIG. 3, boiler system 10 is a conventional wall of boiler panels in which every other receiver panel has upflow and every other receiver panel has downflow. FIG. 4 shows a system 20 which, similarly has every other panel with upflow and every other panel with downflow.

The multiple pass configurations of boilers 30 and 100 described above are well suited for use in superheater and reheater sections of solar boilers. Due to the highly variable heat input, which can vary drastically over a very short distance, large steam temperature unbalances can occur, which could lead to overheating and ultimately failure of tubes. By using multiple passes, which are relativley short in length, the fluid is allowed to mix and reach an equilibrium, which keeps the steam temperature unbalances to a minimum. It is advantageous for steam generators in boiler heaters to have a single pass configuration in which sub-cooled liquid water is supplied and a saturated steam/water mixture is returned.

Figure 6:
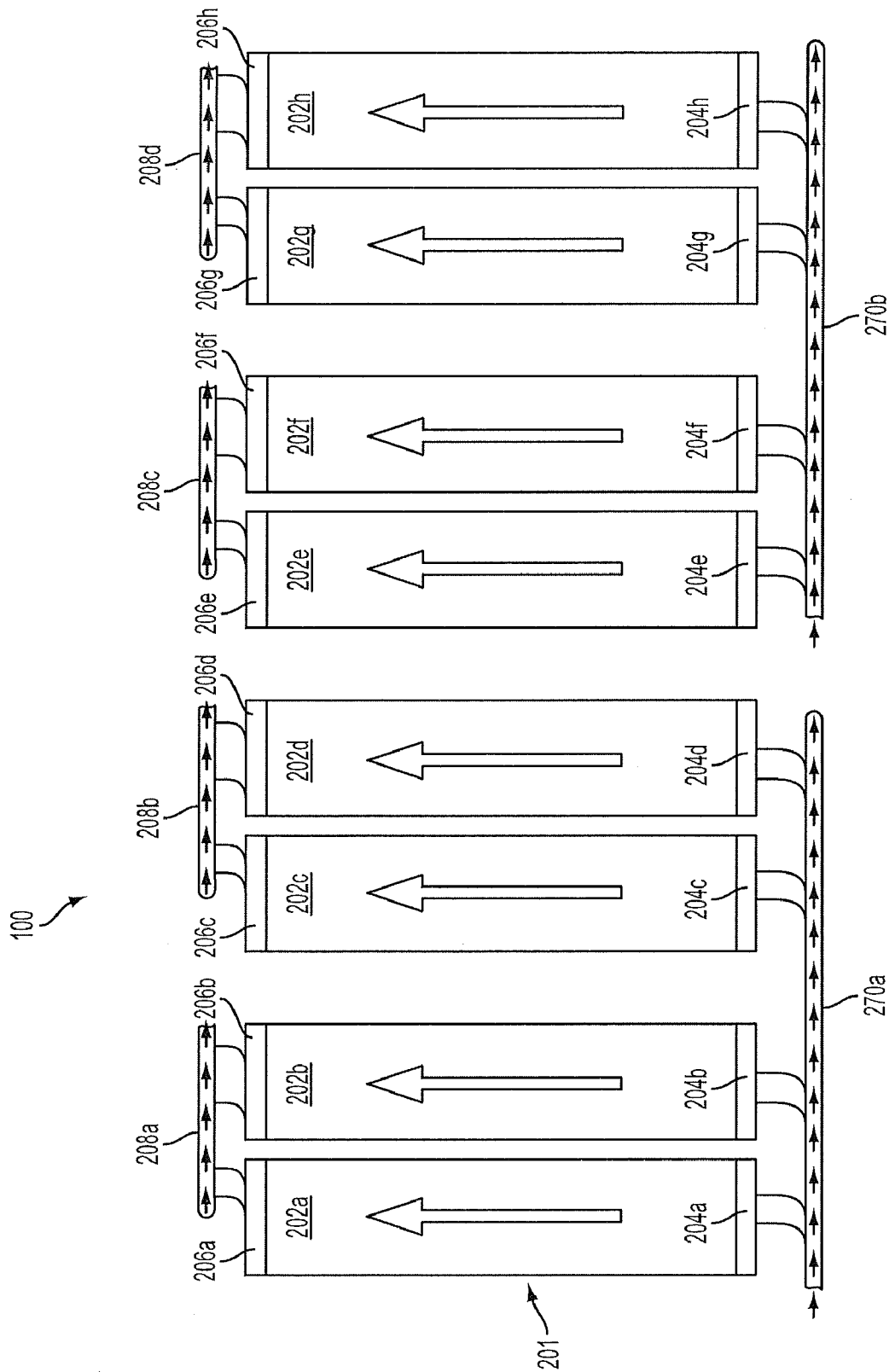
FIG. 6 is schematic view of another exemplary embodiment of a section of boiler panels in a boiler wall constructed in accordance with the present invention, showing a flow configuration for a steam generator.

FIG. 6 schematically shows the routing of working fluid through a section 201 of a steam generator boiler wall of boiler 100. Working fluid is introduced through two inlet pipes 270*a* and 270*b*. Inlet pipe 270*a* feeds lower headers 204*a*-204*d* of panels 202*a*-202*d*, respectively, and inlet pipe 270*b* feeds lower headers 204*e*-204*h* of panels 202*e*-202*h*, respectively. The working fluid is conveyed in parallel upwards through the tubes of panels 202*a*-202*h* to the respective upper headers 206*a*-206*h*. Headers 206*a* and 206*b* feed outlet pipe 208*a*, headers 206*c* and 206*d* feed outlet pipe 208*b*, headers 206*e* and 206*f* feed outlet pipe 208*c*, and headers 206*g* and 206*h* feed outlet pipe 208*d*. Outlet pipes 208*a*-208*d* return heated working fluid to a hot return, such as a drum for separating saturated steam from saturated liquid water. As can be seen in FIG. 6, section 201 routes working fluid through each of eight panels in an upward direction, just as described above with respect to section 101.

Figure 7:
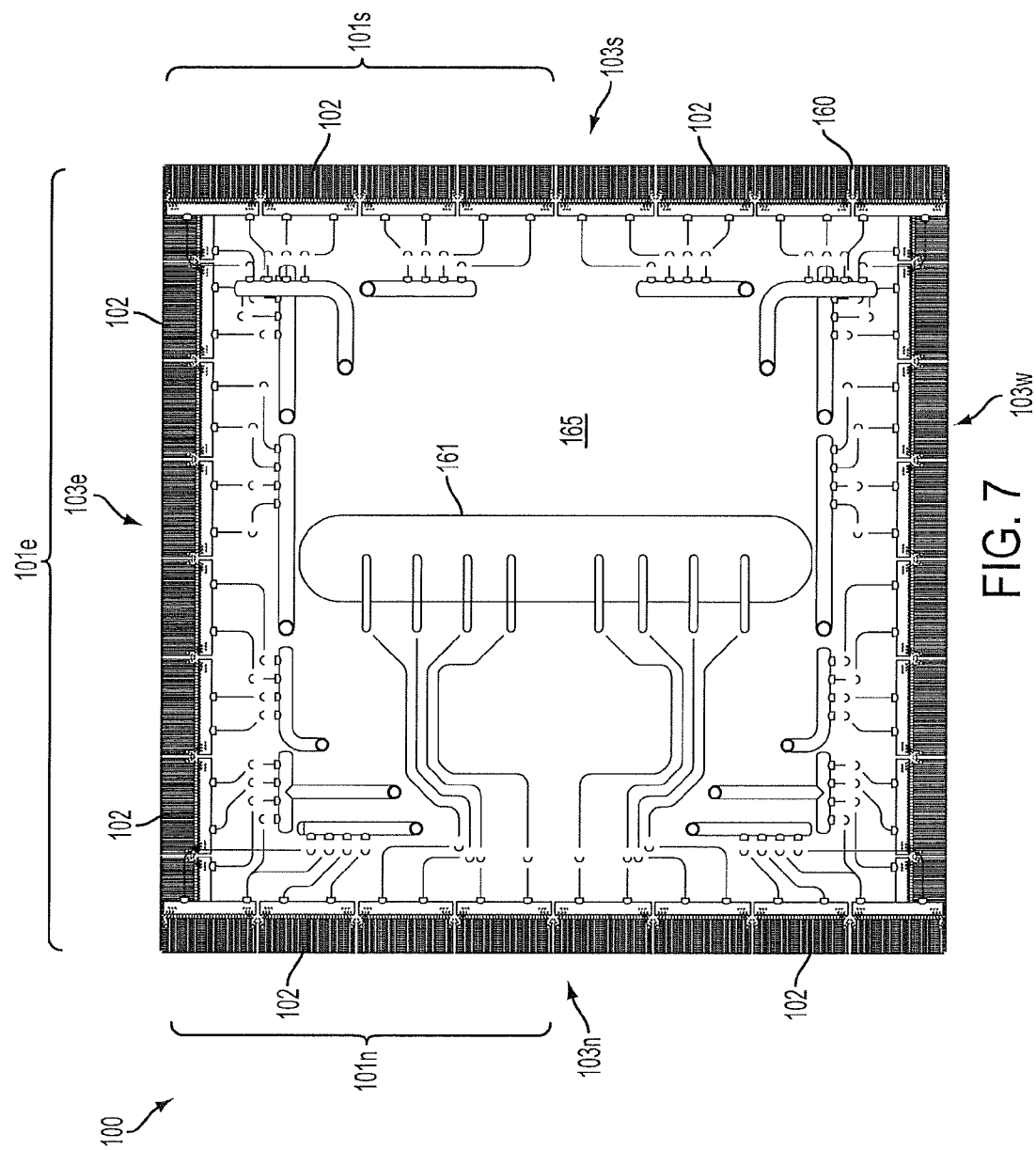
FIG. 7 is a schematic view of an exemplary embodiment of a solar boiler constructed in accordance with the present invention, showing four boiler walls in a schematic plan view.

Referring now to FIG. 7, boiler 100 includes a superheater 160. Superheater 160 includes four boiler walls 103*n*, 103*e*, 103*s*, and 103*w*, which are arranged in a rectangular plan around an interior space 165. Each of the four boiler walls includes one or more sections 101 of individual panels, as shown above in FIG. 1, the exterior surfaces of which form a solar receiving surface. There are a total of eight panels 102 per boiler wall for a total of thirty-two individual panels 102.

Superheater 160 includes two symmetrical eight-pass circuits, described as follows. Steam from drum 161 is supplied to the two panels 102 of section 101*n* of wall 103*n* that are closest to the center of wall 103*n* (only some of the thirty two panels 102 are labeled in FIG. 7 for sake of clarity). This constitutes the first pass. From there, the steam is supplied to the remaining two panels of section 101*n* for the second pass. The third through sixth passes are in the four pairs of panels 102 in section 101*e* of wall 103*e*. The eight panels 102 of wall 103*e* are configured as shown in FIG. 5. From the last pair of panels in wall 103*e*, steam is supplied to the two panels in section 101*s* nearest the corner for the seventh pass. Finally steam passes from the seventh pass into the last two panels 102 of section 101*s*, which are nearest the center of wall 103*s*, for the eighth and final pass. The eight passes of the upper half of superheater 160, as oriented in FIG. 7, have been described. The eight passes of the lower half of superheater 160 are symmetrical with eight passes the upper half just described, as can be seen in FIG. 7, so a description of the eight passes will not be repeated for the lower half of superheater 160 in FIG. 7. Each eight pass circuit of superheater 160 returns superheated steam for use in providing power, such as in a high pressure stage of a steam turbine.

Figure 8:
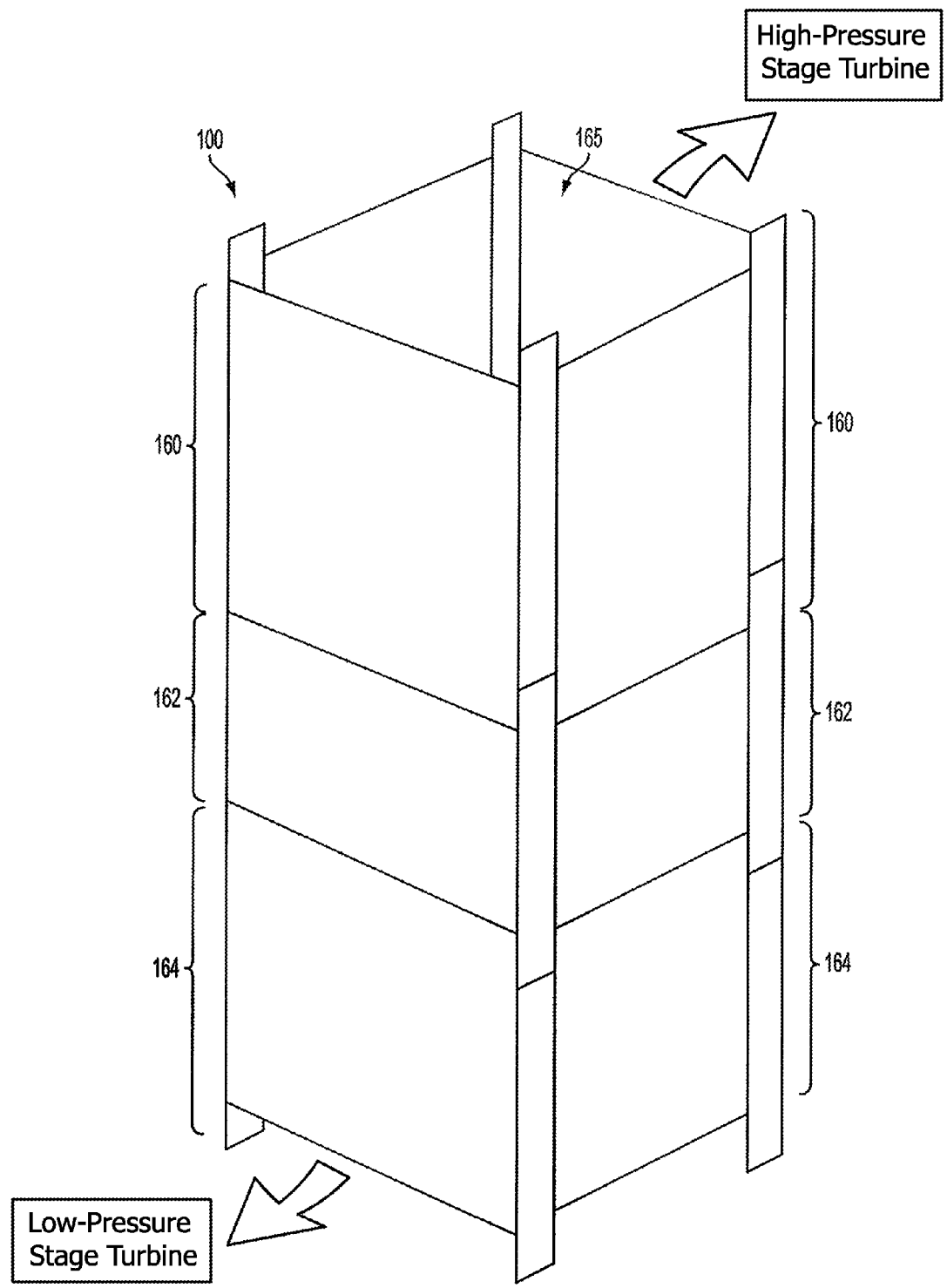
FIG. 8 is a perspective view of the solar boiler of FIG. 7, showing a steam generator, superheater, and reheater stacked in alignment with one another.

With reference now to FIG. 8, boiler 100 also includes a steam generator 162 and reheater 164 that are configured with boiler walls in essentially the same rectangular plan as shown in FIG. 7. However, in the case of steam generator 162, all of the thirty-two panels are connected for parallel flow in a single pass as shown in FIG. 6 rather than an eight-pass configuration. The sections 201 of steam generator 162 are each connected to receive saturated water from drum 161 and to return a mixture of saturated steam and saturated water to drum 161. The sections of reheater 164 are fluidly connected to receive steam used by the high-pressure stage of a steam turbine, and to return reheated steam to provide power in addition to the power provided by superheater 160, such as in a low-pressure stage of a steam turbine. Thus each of steam generator 162, superheater 160, and reheater 164 are in fluid communication with drum 161 to form a steam cycle or circuit. Those skilled in the art will readily appreciate that the circuit or cycle can be adapted to be open or closed, or in any other suitable configuration for a given application, without departing from the spirit and scope of the invention.

With continued reference to FIG. 8, reheater 164, steam generator 162, and superheater 160 are stacked and aligned as shown in FIG. 8 with reheater 164 on the bottom, steam generator 162 in the middle, and superheater 160 on the top. With the individual panels (e.g. 102) in close alignment with one another both horizontally and vertically, the collective surfaces of the ninety-six total panels creates four substantially solid receiver surfaces for receiving solar radiation from heliostats on all four sides of boiler 100. The walls 103*n*, 103*e*, 103*s*, and 103*w* can be arranged to face North, East, South, and West, respectively, for example, and boiler 100 can be placed on top of a central receiver tower in a heliostat field. With such a receiver configuration, a field of heliostats can surround boiler 100 in all compass directions to supply radiation for heating the working fluid.

While described in the context of a four sided, single-reheat boiler having a total of ninety-six individual panels, those skilled in the art will readily appreciate that any suitable number and configuration of superheater, reheater, and steam generation stages, panels, and sides can be used without departing from the spirit and scope of the invention. Also, while boiler systems have been described above in the context of using steam as a working fluid to drive a multi stage steam turbine, those skilled in the art will readily appreciate that any suitable working fluid can be used for any suitable purpose without departing from the spirit and scope of the invention.

The methods and systems of the present invention, as described above and shown in the drawings provide for flow in the same direction in each panel of a boiler panel wall, such as in a solar receiver. This configuration provides improved heat and flow distribution to reduce the risk of overheating due to parallel flow instabilities when compared to previously known configurations. This also provides for efficient drainability of the panels.

While the apparatus and methods of the subject invention have been shown and described with reference to preferred embodiments, those skilled in the art will readily appreciate that changes and/or modifications may be made thereto without departing from the spirit and scope of the invention.

What is claimed is:

1. A boiler for a solar receiver comprising:
  a) a boiler drum;
  b) a steam generator in fluid communication with the boiler drum;
  c) a superheater with an inlet in fluid communication with the boiler drum and an outlet in fluid communication with a first turbine stage; and
  d) a reheater with an inlet in fluid communication with the first turbine stage and an outlet in fluid communication with a second turbine stage, wherein each of the superheater and reheater includes:
    i) at least one boiler wall, each boiler wall including a plurality of boiler panels arranged side by side with each other;
    ii) piping fluidly connecting the plurality of boiler panels together to route a working fluid through the at least one boiler wall from at least one inlet of the at least one boiler wall to at least one outlet of the at least one boiler wall, wherein the piping and boiler panels are configured and adapted to route the working fluid through each of the boiler panels in an upward direction, and wherein the piping is configured and adapted to route working fluid through a series of pairs of individual boiler panels, wherein the individual boiler panels of each pair of boiler panels are in parallel with each other within the respective pair of boiler panels, wherein each boiler wall of the superheater and reheater includes one section having four pairs of individual boiler panels.

2. A boiler as recited in claim 1, wherein each of the steam generator, superheater, and reheater includes four boiler walls surrounding a boiler interior, and wherein the steam generator, superheater, and reheater are stacked in alignment with one another.

* * * * *